US012698073B2

(12) United States Patent
Inoue

(10) Patent No.: US 12,698,073 B2
(45) Date of Patent: Aug. 4, 2026

(54) TRAILERING SUPPORT DEVICE AND METHOD, AND MARINE VESSEL INCLUDING TRAILERING SUPPORT DEVICE

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 268 days.

(21) Appl. No.: 18/528,847

(22) Filed: Dec. 5, 2023

(65) Prior Publication Data

US 2024/0199186 A1 Jun. 20, 2024

(30) Foreign Application Priority Data

Dec. 16, 2022 (JP) ................................. 2022-201312

(51) Int. Cl.
    *B60P 3/10*       (2006.01)
    *B63B 49/00*     (2006.01)
    (Continued)

(52) U.S. Cl.
    CPC ............ *B63H 25/04* (2013.01); *B60P 3/1033* (2013.01); *B63B 49/00* (2013.01); *B63B 79/10* (2020.01); *B63B 79/40* (2020.01)

(58) Field of Classification Search
    CPC ...... B60P 3/1033; B60P 3/1075; B63B 49/00; B63B 79/10; B63B 79/40; B63C 3/12;
    (Continued)

(56) References Cited

U.S. PATENT DOCUMENTS 11,351,907 B2 * 6/2022 Wright, III ............ G01S 13/867
11,787,325 B2 * 10/2023 Traub ................... G05D 1/0206
                                 701/300

(Continued)

FOREIGN PATENT DOCUMENTS

JP      2023-13062 A     1/2023
JP      2023-18465 A     2/2023
WO    2016/163559 A1   10/2016

OTHER PUBLICATIONS

Official Communication issued in corresponding European Patent Application No. 23213417.1, mailed on Apr. 22, 2024.

*Primary Examiner* — Matthew J. Reda
(74) *Attorney, Agent, or Firm* — Keating & Bennett, LLP

(57) ABSTRACT

A trailering support device able to facilitate loading of a hull onto a trailer includes one or more controllers configured or programmed to perform an automatic vessel steering control to move the hull toward the trailer; estimate, based on a content of the automatic vessel steering control, a position and an azimuth of the hull at a predetermined time after a start of the automatic vessel steering control; detect the position, a steering angle, and the azimuth of the hull; compare the estimated position and azimuth, respectively, with the position and the azimuth detected at the predetermined time; and determine, based on a comparison result, whether the loading of the hull onto the trailer able to be performed; and in a case where it is determined that the loading of the hull onto the trailer is not able to be performed, provide notification of the determination that the loading of the trailer is not able to be performed.

12 Claims, 6 Drawing Sheets

(51) Int. Cl.
*B63B 79/10* (2020.01)
*B63B 79/40* (2020.01)
*B63H 25/04* (2006.01)

(58) Field of Classification Search
CPC ........ B63H 21/22; B63H 25/04; G05D 1/248;
G05D 1/661; G05D 2105/22; G05D
2107/84; G05D 2109/34
See application file for complete search history.

(56) References Cited

U.S. PATENT DOCUMENTS

| | | | |
|---|---|---|---|
| 2018/0050772 A1* | 2/2018 | Koyano | B63H 21/21 |
| 2018/0361929 A1* | 12/2018 | Zhang | B60D 1/366 |
| 2019/0300138 A1* | 10/2019 | Akuzawa | G05D 1/02 |
| 2019/0302774 A1* | 10/2019 | Akuzawa | G05D 1/0206 |
| 2019/0361457 A1 | 11/2019 | Johnson et al. | |
| 2021/0350710 A1* | 11/2021 | Shimokawabe | G08G 3/02 |
| 2022/0281569 A1* | 9/2022 | Traub | G05D 1/0206 |
| 2022/0371503 A1 | 11/2022 | Traub et al. | |
| 2023/0021321 A1 | 1/2023 | Inoue | |
| 2023/0033273 A1 | 2/2023 | Inoue | |
| 2023/0359199 A1* | 11/2023 | Adachi | G06F 3/012 |

* cited by examiner

TRAILERING SUPPORT DEVICE AND METHOD, AND MARINE VESSEL INCLUDING TRAILERING SUPPORT DEVICE

CROSS REFERENCE TO RELATED APPLICATIONS

This application claims the benefit of Japanese Patent Application No. 2022-201312, filed Dec. 16, 2022, which is hereby incorporated by reference herein in its entirety.

BACKGROUND OF THE INVENTION

1. Field of the Invention

The present invention relates to a trailering support device and method, and a marine vessel including the trailering support device.

2. Description of the Related Art

Conventionally, loading a hull onto a trailer has been performed mainly to land a small hull. International Publication WO 2016/163559 discloses a technique for acquiring positions of a hull and a trailer and controlling a propulsion device or the like to automatically load (mount) the hull onto the trailer.

However, in some cases, while automatic loading control is executed, the hull does not move as predicted by the control due to disturbance such as wind, tidal current, or waves acting on the hull, and the hull may not be smoothly loaded onto the trailer. Especially, an inexperienced vessel operator is not able to accurately determine whether or not the loading of the hull onto the trailer is able to be performed until the hull is considerably close to the trailer.

SUMMARY OF THE INVENTION

Preferred embodiments of the present invention provide trailering support devices and methods able to facilitate loading of a hull onto a trailer, and marine vessels including the trailering support devices.

According to a preferred embodiment of the present invention, a trailering support device for loading a hull onto a trailer includes one or more controllers configured or programmed to function as a vessel steering controller to perform an automatic vessel steering control to move the hull toward the trailer; an estimation unit to estimate, based on a content of the automatic vessel steering control, a position of the hull at a predetermined time after a start of the automatic vessel steering control and an azimuth of the hull at the predetermined time; a detector to detect the position of the hull, a steering angle of the hull, and the azimuth of the hull; a determination unit to compare the position and the azimuth estimated by the estimation unit, respectively, with the position and the azimuth detected by the detector at the predetermined time; and to determine, based on a comparison result, whether the loading of the hull onto the trailer is able to be performed or not, and a notifier to provide notification, in a case where the determination unit determines that the loading of the hull onto the trailer is not able to be performed, that the loading of the hull onto the trailer is not able to be performed.

According to this configuration, the automatic vessel steering control is performed to move a hull toward a trailer to load the hull to the trailer, the position and the azimuth of the hull at a predetermined time after the start of the automatic vessel steering control are estimated based on the content of the automatic vessel steering control, and the position, the steering angle and the azimuth of the hull are detected. Thereafter, it is determined whether or not the hull is able to be loaded onto the trailer based on a comparison result between the estimated position and the estimated azimuth and the position and the azimuth detected at the predetermined time, respectively, and in a case where it is determined that the hull cannot be loaded onto the trailer, providing notification that the hull cannot be loaded onto the trailer.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
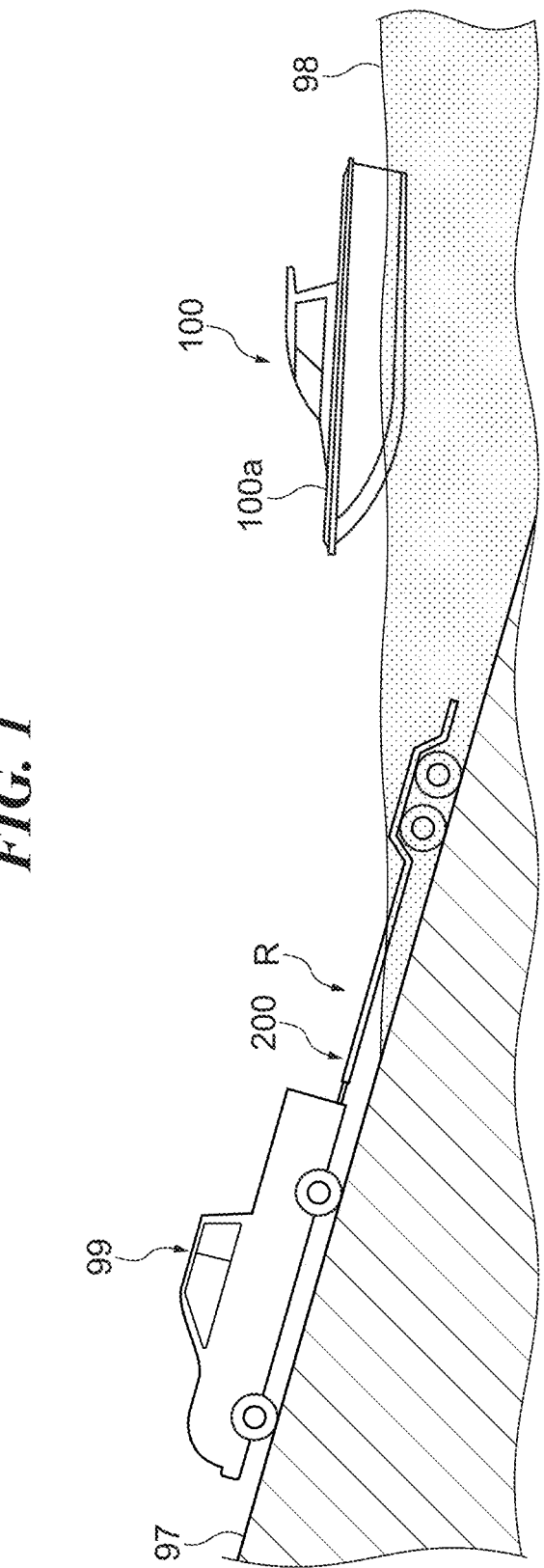
FIG. 1 is a side view illustrating an example of a trailering system to which a trailering support device is applied.
Figure 2:
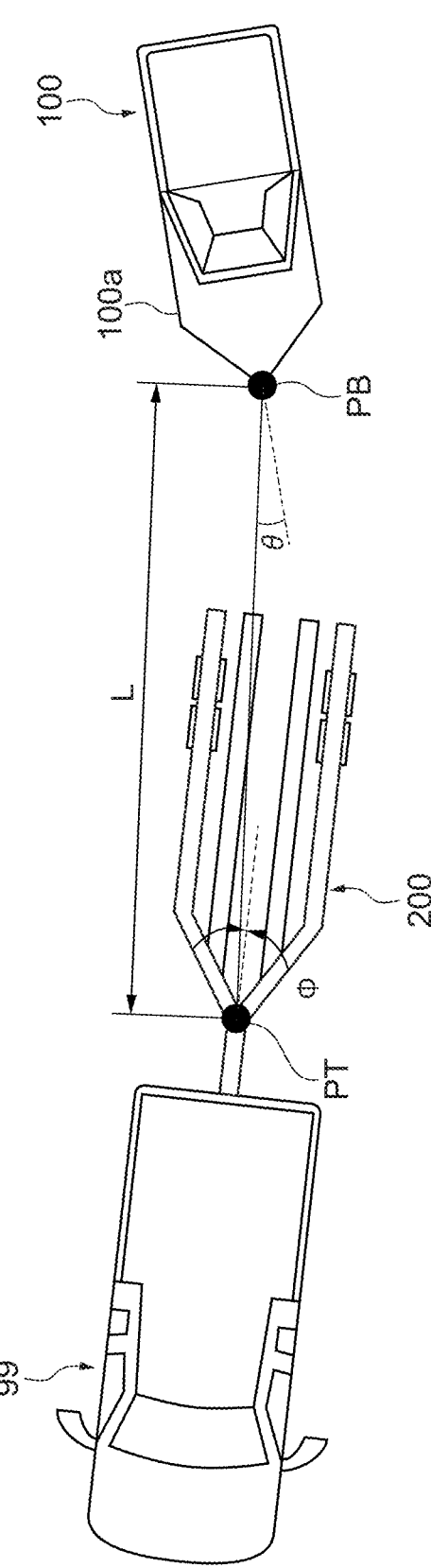
FIG. 2 is a top view illustrating an example of the trailering system.

FIG. 1 is a side view illustrating an example of a trailering system 1000 to which a trailering support device according to a preferred embodiment of the present invention is applied. FIG. 2 is a top view illustrating an example of the trailering system 1000. The trailering system 1000 includes a marine vessel 100 and a trailer 200 on which a marine vessel 100 can be placed. The trailer 200 is for a marine vessel towed by a vehicle 99 operated by a driver. The marine vessel 100 may be, for example, a so-called jet boat.

The trailering system 1000 is able to detach the marine vessel 100 from the trailer 200 and attach the marine vessel to the trailer 200. An inclined portion (ramp) R inclined downwards toward the bottom of water is formed on the water side. When moving the marine vessel 100 from the trailer 200 on land 97 to a water surface 98 (when the marine vessel 100 leaves the trailer 200), a driver drives the vehicle 99 to move the trailer 200 to the inclined portion R, as illustrated in FIG. 1. Here, when an automatic separation mode is started (when a vessel steering mode is switched to the automatic separation mode), the marine vessel 100 is automatically steered, and the marine vessel 100 automatically moves in a direction away from the trailer 200. As a result, the marine vessel 100 is automatically separated from the trailer 200. It is noted that it is not essential that the marine vessel 100 is automatically separated from the trailer 200.

When moving the marine vessel 100 from the water surface 98 to the trailer 200 on the land 97 (when the marine vessel 100 is attached to the trailer 200), the driver first moves the trailer 200 to the inclined portion R. Here, when an automatic trailer mode is started (when the vessel steering mode is switched to the automatic trailer mode), the marine vessel 100 is automatically steered, and the marine vessel 100 automatically moves in a direction toward the trailer 200. As a result, the marine vessel 100 is automatically mounted on the trailer 200. As a method of allowing the marine vessel 100 to be automatically separated from and automatically mounted on the trailer 200, a known method disclosed in International Publication WO 2016/163559 or the like may be used, the disclosure of which is herein incorporated by reference in its entirety.

It is noted that it is efficient to allow the marine vessel 100 to be automatically separated from or mounted on the trailer 200 (especially mounted on the trailer 200) as described above after a controller 101 specifies "relative position information" between the marine vessel 100 and the trailer 200. The "relative position information" is defined as a quantity as viewed from above as illustrated in FIG. 2, and includes a distance L, a vessel azimuth φ, and a trailer azimuth θ. Reference positions in defining the relative position information include a reference position PT on the trailer 200 and a reference position PB on the marine vessel 100, as illustrated in FIG. 2. The reference position PT and the reference position PB may be respectively any portion of the trailer 200 and the marine vessel 100.

The distance L is a distance between the trailer 200 and the marine vessel 100. That is, the distance L is a linear distance between the reference position PT and the reference position PB. The vessel azimuth φ is a relative azimuth (direction) of the marine vessel 100 as viewed from the trailer 200. The trailer azimuth θ is a relative azimuth (direction) of the trailer 200 as viewed from the marine vessel 100.

Figure 3:
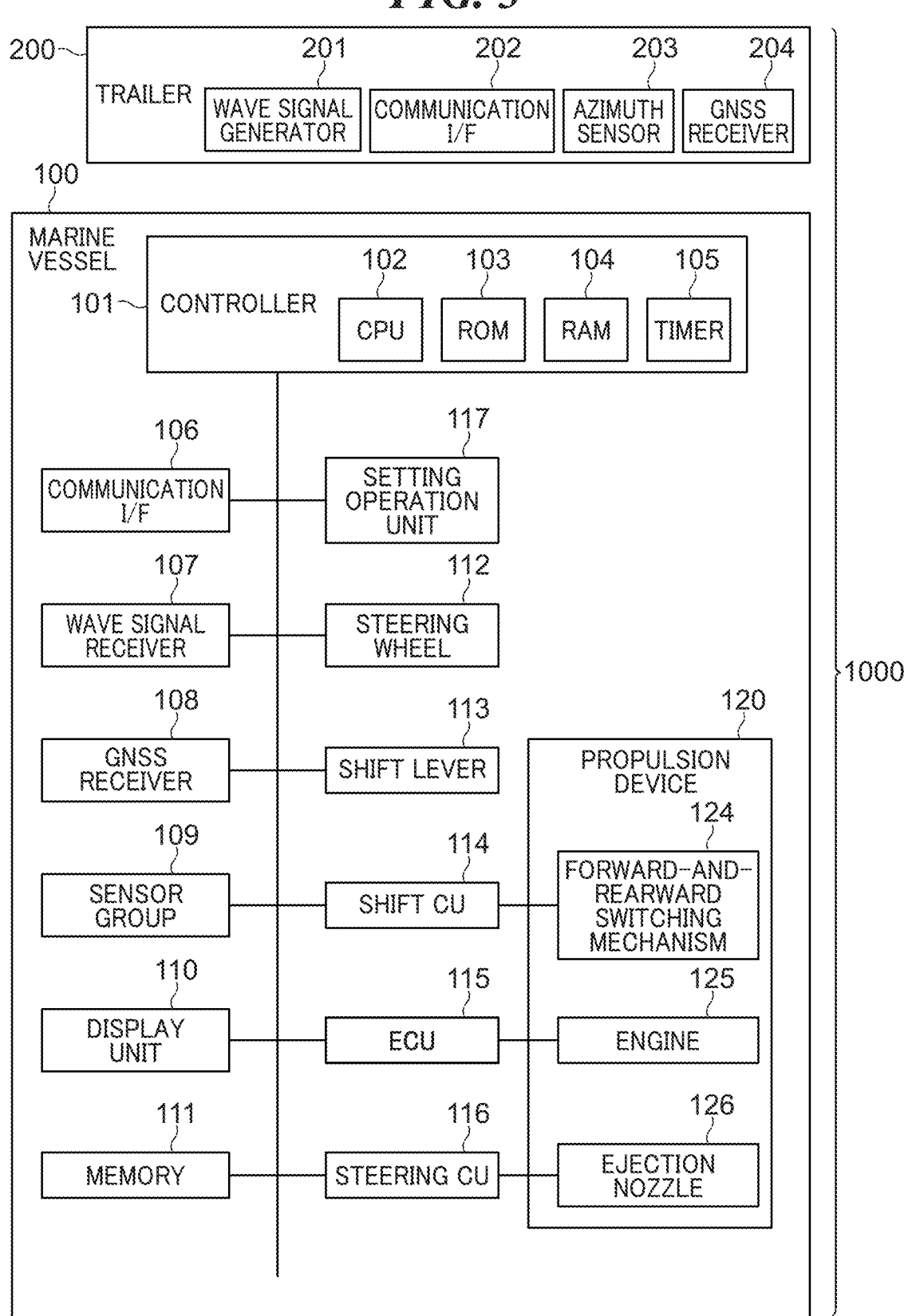
FIG. 3 is a block diagram of the trailering system.

FIG. 3 is a block diagram of the trailering system 1000. The marine vessel 100 includes the hull 100a (refer to FIGS. 1 and 2) and a propulsion device 120 provided on the hull 100a. The marine vessel 100 obtains a propulsive force by ejecting a jet of water by the propulsion device 120.

The propulsion device 120 includes an engine 125 to generate a driving force, a forward-and-rearward switching mechanism 124 to transmit the driving force of the engine 125 in an adjusted state, and an ejection nozzle 126 to eject a jet of water. The propulsion device 120 includes a propeller (not illustrated) to which the driving force of the engine 125 is transmitted via the forward-and-rearward switching mechanism 124. The propulsion device 120 generates a jet of water from the ejection nozzle 126 by rotating the propeller by the driving force. In addition, the propulsion device 120 adjusts the traveling direction of the marine vessel 100 by changing the ejection direction of the jet of water from the ejection nozzle 126 generated by the rotation of the propeller.

The marine vessel 100 further includes a controller 101, an engine control unit (ECU) 115, a shift control unit (CU) 114, and a steering CU 116. The controller 101 entirely controls the marine vessel 100 including the propulsion device 120. The controller 101 includes a CPU 102, a ROM 103, a RAM 104, and a timer 105, for example. The ROM 103 stores a control program. The CPU 102 implements various types of control processes by loading the control program stored in the ROM 103 to the RAM 104 and executing the control program. The RAM 104 provides a work area when the CPU 102 executes the control program. The ECU 115, the shift CU 114, and the steering CU 116 control the engine 125, the forward-and-rearward switching mechanism 124, and the ejection nozzle 126, respectively, based on an instruction from the controller 101.

The marine vessel 100 further includes a sensor group 109. The sensor group 109 includes a tide sensor, a wind speed sensor, a wind direction sensor, an azimuth sensor, a steering angle sensor, a hook sensor, a water landing sensor, an acceleration sensor, a speed sensor, and an angular speed sensor (all not illustrated). The tide sensor detects a tide. The wind speed sensor detects a wind speed. The wind direction sensor detects a wind direction. The azimuth sensor detects an absolute azimuth of the hull 100a. The steering angle sensor detects a steering angle of hull 100a by detecting a rotation angle of a steering wheel 112.

The hook sensor detects that the hook of the trailer 200 is hooked on the hull 100a. The water landing sensor detects that the ejection nozzle 126 of the propulsion device 120 is located in the water. The acceleration sensor detects the posture of the hull 100a by detecting the inclination of the hull 100a in addition to detecting the acceleration of the hull 100a. The speed sensor detects the speed of the hull 100a, and the angular speed sensor detects the angular speed of the hull 100a. It is noted that it is not essential for the sensor group 109 to include all these sensors.

The steering wheel 112 and a shift lever 113 are provided on the hull 100a of the marine vessel 100. The controller 101 controls the ejection direction of the jet of water ejected from the ejection nozzle 126, via the steering CU 116, based on the rotation angle of the operated steering wheel 112. In addition, the controller 101 performs a control to change a shift position in the forward-and-rearward switching mechanism 124, via the shift CU 114, based on the position of the operated shift lever 113.

The marine vessel 100 further includes a memory 111, a display unit 110, a setting operation unit 117, a communication I/F 106, a wave signal receiver 107, and a GNSS receiver 108. The memory 111 may be a nonvolatile storage medium. The display unit 110 includes a display, and displays various types of information based on an instruction from the controller 101. The display unit 110 may have a function of generating sound. The setting operation unit 117 includes an operator to perform an operation related to vessel steering, a setting operator to perform various settings, and an input operator to input various instructions (all not illustrated).

The communication I/F 106 is able to communicate with an external device in a wireless and/or wired manner. The GNSS receiver 108 periodically receives a global navigation satellite systems (GNSS) signal from a GNSS satellite. A signal (described below) received by the wave signal receiver 107 and a signal received by the GNSS receiver 108 are supplied to the controller 101.

The trailer 200 includes a wave signal generator 201, a communication I/F 202, an azimuth sensor 203, and a GNSS receiver 204. The communication I/F 202 is able to communicate with an external device in a wireless and/or wired manner. The communication I/F 202 is further able to communicate with the communication I/F 106 by near field communication or the like. It is noted that a communication method between the marine vessel 100 and the trailer 200 is not limited. The GNSS receiver 204 periodically receives a GNSS signal from a GNSS satellite. The azimuth sensor 203 detects an absolute azimuth of the trailer 200.

The GNSS signal received by the GNSS receiver 204 is transmitted by the communication I/F 202 as a signal indicating a current position (an absolute position) of the trailer 200, and is received by the communication I/F 106 of the marine vessel 100. In addition, a signal indicating the azimuth (the absolute position) of the trailer 200 detected by the azimuth sensor 203 is also transmitted by the communication I/F 202 and received by the communication I/F 106 of the marine vessel 100.

Although it is not essential to provide the wave signal generator 201 and the wave signal receiver 107, these units will be described below.

The controller 101 defining a vessel steering controller 401 performs an automatic vessel steering control to move the hull 100a toward the trailer 200 in the automatic trailer mode. During the execution of the automatic vessel steering control, the hull 100a may not move as predicted by the control due to disturbance such as wind, tidal current, or waves acting on the hull 100a, and the hull 100a may not be smoothly loaded onto the trailer 200. Especially, an inexperienced vessel operator is not able to accurately determine whether or not the loading of the hull 100a onto the trailer 200 is able to be performed until the hull 100a is considerably close to the trailer 200. Therefore, in the present preferred embodiment, in a case where it is determined that the hull 100a cannot be loaded onto the trailer 200 in the automatic trailer mode (the automatic vessel steering control), the fact that the hull 100a cannot be loaded onto the trailer 200 is notified, thus making it possible to facilitate loading of the hull 100a onto the trailer 200.

When executing the automatic trailer mode, the controller 101 specifies a trailer (hereinafter, referred to as a "target trailer") on which the hull 100a is to be loaded. As a method for specifying the target trailer, a known method may be used. As an example of this method, for example, in a case where there are a plurality of trailers that transmit position information, the controller 101 acquires the current position of each trailer through wireless communication. Then, the controller 101 displays the acquired current positions of the trailers on the screen of the display unit 110. The controller 101 specifies, on the display screen, the target trailer by receiving a designation of a desired position among the positions of the respective trailers from a user.

Alternatively, one of the trailers for which near field communication is established may be specified as the target trailer. In this case, the controller 101 may receive information on the current position of the target trailer by wireless communication.

Alternatively, a method disclosed in Japanese Patent Application No. 2021-122618 or Japanese Patent Application No. 2021-116970, the disclosures of which are herein incorporated by reference in their entirety, may be used. The marine vessel 100 may receive a laser beam or a wave signal emitted from a certain trailer such that the certain trailer may be specified as the target trailer. For example, the wave signal generator 201 provided in the trailer 200 emits a wave signal from at least three different positions whose "relative positional relationship" with each other is known. As an example, the wave signal may be an optical signal, the wave signal generator 201 may be three LEDs, and the wave signal receiver 107 may be a camera.

The relative position information may be specified based on the wave signal emitted from each position and received by the wave signal receiver 107 provided in the marine vessel 100. For example, the controller 101 can extract bright spots from an image obtained by the camera imaging the optical signals emitted from the three LEDs, and can acquire the relative position information (the trailer azimuth θ, the vessel azimuth φ, and the distance L) based on the positions of the bright spots in the image and the "relative positional relationship". It is noted that, in the case of using a method that does not use the relative position information to specify the target trailer, it is not essential to specify the relative position information.

Figure 4:
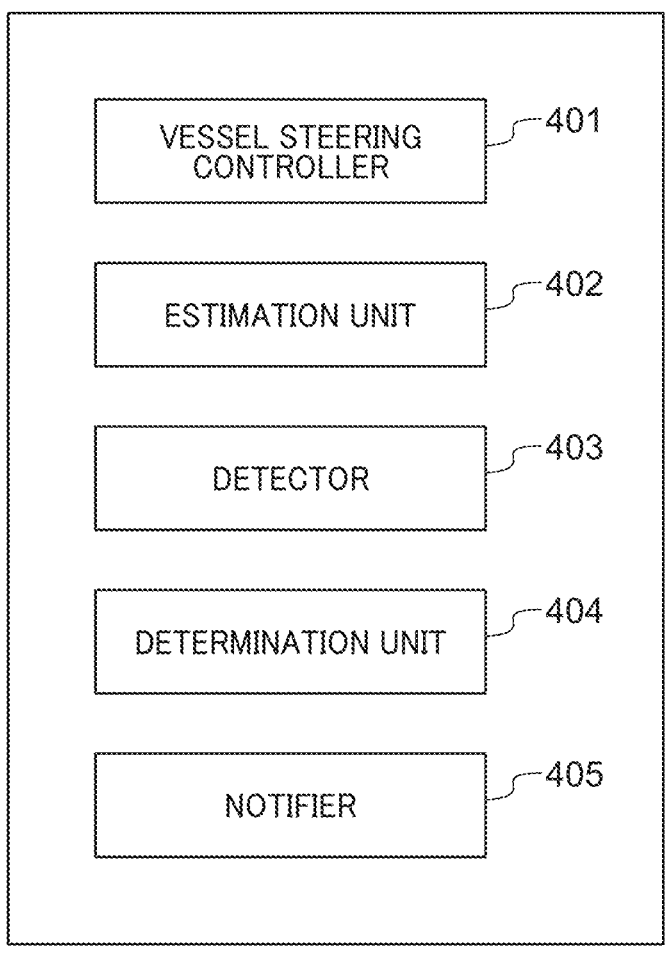
FIG. 4 is a diagram illustrating a functional block of the trailering support device.

FIG. 4 is a diagram illustrating a functional block of the trailering support device. This functional block includes, as functional units, the vessel steering controller 401, an estimation unit 402, a detector 403, a determination unit 404, and a notifier 405.

Each of these functional units is mainly implemented through cooperation between at least one of the communication I/F 106, the GNSS receiver 108, the sensor group 109, the display unit 110, or the memory 111; and the controller 101.

The function of the vessel steering controller 401 is mainly implemented by the controller 101. The vessel steering controller 401 performs the automatic vessel steering control so as to cause the hull 100a to move toward the trailer 200.

The function of the estimation unit 402 is mainly implemented by the controller 101 and the memory 111. Based on the content of the automatic vessel steering control to be performed by the vessel steering controller 401, the estimation unit 402 performs an estimation process to estimate "the position and the azimuth of the hull 100a at a "comparison time" which is a predetermined time". The comparison time is repeated (for example, repeated periodically) after the start of the automatic vessel steering control. The content of the automatic vessel steering control includes at least one of a control of the steering angle of the hull 100a or a control of the output of the propulsion device 120. For example, the automatic vessel steering control may be implemented by controlling the steering angle, with the forward shift and constant output (idle rotation) of the propulsion device 120.

For example, the comparison time is a time at which a predetermined period of time T has elapsed since the last time the estimation unit 402 estimated the position and the azimuth of the hull 100a. Alternatively, the comparison time may be a time at which the hull 100a has moved by a first predetermined distance since the last time the estimation unit 402 estimated the position and the azimuth of the hull 100a. Alternatively, the comparison time may be an earlier time between the time at which the predetermined period of time T has elapsed and the time at which the hull 100a has moved by the first predetermined distance since the last time the estimation unit 402 estimated the position and the azimuth of the hull 100a.

The function of the detector 403 is mainly implemented by the controller 101, the GNSS receiver 108, and the sensor group 109. The detector 403 detects the position, the steering angle, and the azimuth, of the hull 100a. Namely, the detector 403 acquires the current position (the absolute position) of the hull 100a from the GNSS signal received by the GNSS receiver 108. The detector 403 detects the current azimuth (the absolute azimuth) of the hull 100a by the azimuth sensor in the sensor group 109. Further, the detector 403 detects the steering angle of the hull 100a by the steering angle sensor in the sensor group 109.

The determination unit 404 is mainly implemented by the controller 101. The determination unit 404 compares the position and the azimuth of the hull 100a estimated by the estimation unit 402 with the position and the azimuth of the hull 100a detected at the comparison time by the detector 403. Then, the determination unit 404 determines whether or not the hull 100a can be loaded onto the trailer 200 (that is, determines whether the hull 100a is loadable/unloadable) based on the comparison result.

The function of the notifier 405 is mainly implemented by the controller 101 and the display unit 110. In a case where the determination unit 404 determines that the hull 100a cannot be loaded onto the trailer 200, the notifier 405 provides notification of information indicating that the hull 100a cannot be loaded onto the trailer.

Figure 5:
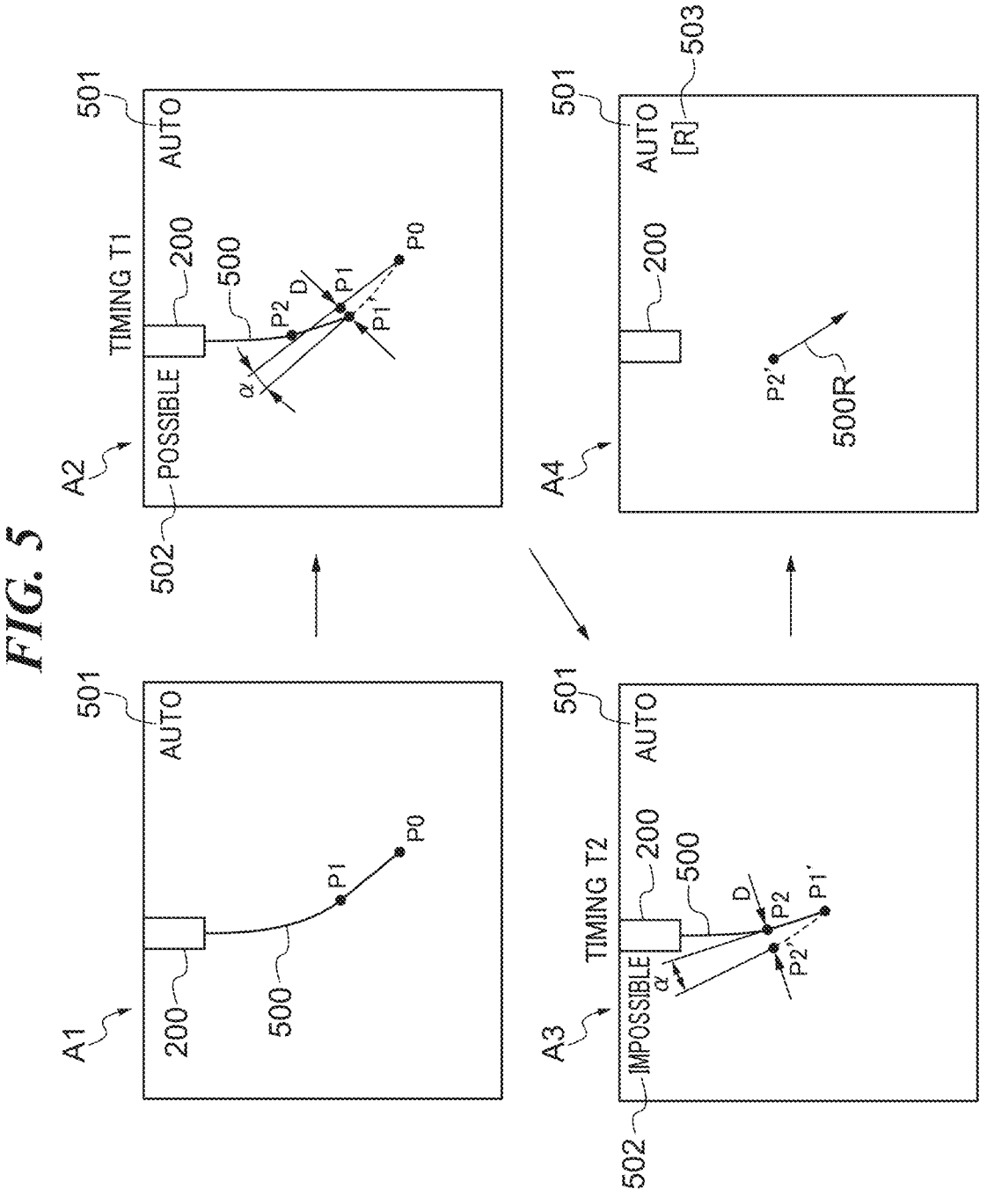
FIG. 5 is a diagram illustrating an example of a state display screen showing a transition of a state during execution of an automatic trailer mode.

FIG. 5 is a diagram illustrating an example of a state display screen showing the transition of a state during execution of the automatic trailer mode. In FIG. 5, screens A1 to A4 are illustrated corresponding to the transition of the state. The screens A1 to A4 are displayed on the display unit 110 after the start of the automatic trailer mode is instructed and the target trailer is specified.

On the screen A1, a position P0 is a current position (an actually detected position) of the hull 100a at the start of the automatic trailer mode, which is an initial position. A predicted position P1 is an estimated position of the hull 100a after the lapse of the predetermined period of time T from the start of the automatic trailer mode. A predicted trajectory 500 is a predicted future movement trajectory of the hull 100a starting from the position P0. "AUTO" indicating that the automatic vessel steering control is being executed is displayed in a display area 501.

In the screens A1 to A4, the position of the target trailer 200, the predicted position of the hull 100a, the actually detected position of the hull 100a, the movement trajectory of the hull 100a, and the like are displayed. These display modes are not limited to the illustrated modes. Times T1 and T2 to be described below both correspond to comparison times.

The screen A2 shows a state after the predetermined period of time T has elapsed since the time at which the screen A1 was displayed (referred to as the time T1). An actually detected position P1' is the position of the hull 100a detected by the detector 403 at the time T1. On the screen A2, a distance D is a difference (interval) at the time T1 between the predicted position P1 and the actually detected position P1'. An angle difference a is a difference at the time T1 between a predicted azimuth of the hull 100a (an azimuth estimated at the start of the automatic trailer mode) and an actually detected azimuth detected by the detector 403 at the time T1. The predicted azimuth in the screen A2 is a straight line passing through the position P0 and the predicted position P1. The actually detected azimuth in the screen A2 is a straight line passing through the position P0 and the actually detected position P1'. The angle difference a in the screen A2 is an angle formed by the straight line representing the predicted azimuth and the straight line representing the actually detected azimuth in the screen A2.

Here, in a case where the distance D exceeds a second predetermined distance and/or the angle difference a exceeds a predetermined angle, the determination unit 404 determines that the hull 100a cannot be loaded onto the trailer 200. The determination unit 404 determines that the hull 100a can be loaded onto the trailer 200 in a case where the distance D does not exceed the second predetermined distance and the angle difference a does not exceed the predetermined angle. In the state shown in the screen A2, the distance D does not exceed the second predetermined distance and the angle difference a does not exceed the predetermined angle, and thus "possible" indicating that the hull 100a can be loaded onto the trailer 200 is displayed in the display area 502 in the screen A2.

At the time T1, a predicted position P2 after the predetermined period of time T has elapsed (at the time T2) from the time T1 is predicted, a new predicted trajectory 500 starting from the actually detected position P1' is predicted (the predicted trajectory is updated), and the predicted position P2 and the new predicted trajectory 500 are displayed on the screen.

The screen A3 shows a state after the predetermined period of time T has elapsed (the time T2) from the time T1 at which the screen A2 is displayed. An actually detected position P2' is the position of the hull 100a detected by the detector 403 at the time T2. On the screen A3, the distance D is a difference (interval) at the time T2 between the predicted position P2 and the actually detected position P2'. The angle difference a is a difference at the time T2 between the predicted azimuth of the hull 100a (the azimuth estimated at the time T1) and the actually detected azimuth detected by the detector 403 at the time T2. The predicted azimuth in the screen A3 is a straight line passing through the position P1' and the predicted position P2. The actually detected azimuth in the screen A3 is a straight line passing through the position P1' and the actually detected position P2'. The angle difference a in the screen A3 is an angle formed by the straight line representing the predicted azimuth and the straight line representing the actually detected azimuth on the screen A3. In the state shown in the screen A3, the distance D exceeds the second predetermined distance and/or the angle difference a exceeds the predetermined angle, and thus "impossible" indicating that the hull 100a cannot be loaded onto the trailer 200 is displayed in the display area 502 in the screen A3.

The screen A4 shows a state immediately after the time T2. Since it is determined that the loading is impossible at the time T2, the estimation of the predicted position, the predicted azimuth, and the predicted trajectory in the forward direction is not performed thereafter. In this case, the vessel steering controller 401 performs a control to cause the hull 100a to move rearward from the actually detected position P2'. In a case where the hull 100a is caused to move rearward, the notifier 405 provides notification of the rearward movement of the hull 100a. As an example of this notification, the notifier 405 displays, in the display area 503, a mark such as "R" indicating that the shift position of the forward-and-rearward switching mechanism 124, which is a shift mechanism, is put in reverse. It is noted that a predicted trajectory 500R when the hull 100a moves rearward may be predicted and displayed on the screen A4.

Figure 6:
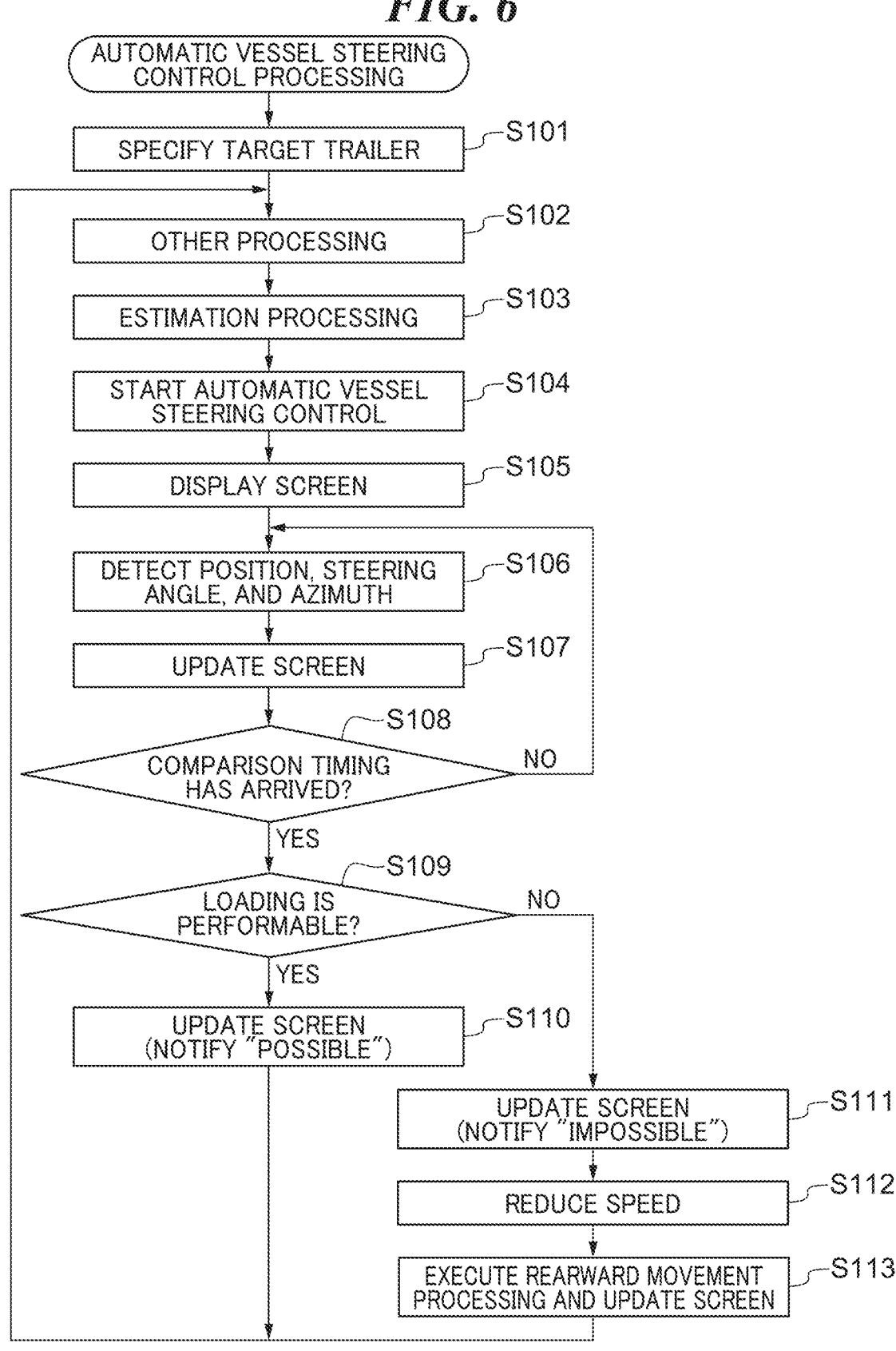
FIG. 6 is a flowchart illustrating an automatic vessel steering control process.

FIG. 6 is a flowchart illustrating an automatic vessel steering control process. This automatic vessel steering control process is started in response to an instruction to start the automatic trailer mode. This automatic vessel steering control process is implemented by the CPU 102 loading a control program stored in the ROM 103 to the RAM 104 and executing the program. The automatic vessel steering control process will be described with reference to FIG. 5 as well.

In step S101, the CPU 102 specifies a target trailer (for example, the trailer 200 in FIG. 5) on which the hull 100a is to be loaded by the above-described method. In step S102, the CPU 102 executes other processes. Here, the CPU 102 can execute, for example, a process to end the automatic vessel steering control process illustrated in FIG. 6, or the like, in response to an instruction from a user.

In step S103, the CPU 102 executes an estimation process. In this estimation process, first, the CPU 102 acquires the position, the steering angle, and the azimuth of the hull 100a. The CPU 102 determines the content of the automatic vessel steering control (the control of the steering angle and/or the output of the propulsion device 120, or the like) to move the hull 100a toward the target trailer 200 based on the acquired position, steering angle, and azimuth of the hull 100a. In addition, the CPU 102 estimates the position (such as the predicted position P1) and the azimuth (the predicted azimuth) of the hull 100a at the comparison time after the lapse of the predetermined period of time T from the current point of time. Further, the CPU 102 predicts the predicted trajectory 500, which is a predicted future movement trajectory of the hull 100a, starting from the current position, based on the determined content of the automatic vessel steering control.

In step S104, the CPU 102 starts the automatic vessel steering control based on the determined content of the automatic vessel steering control. It is noted that, in order to determine the arrival of the next comparison time, the CPU 102 starts clocking.

In step S105, the CPU 102 displays a state display screen on the display unit 110. For example, as shown in the screens A1 to A4 in FIG. 5, the position of the target trailer 200, the current position (such as the position P0) of the hull 100a, the predicted position (such as the predicted position P1) of the hull 100a, the predicted trajectory 500, "AUTO" (the display area 501), and the like are displayed.

In step S106, the CPU 102 detects (acquires) the position, the steering angle, and the azimuth, of the hull 100a. In step S107, the CPU 102 updates the display position of the current position of the hull 100a on the state display screen based on the detected position of the hull 100a. In step S108, the CPU 102 determines whether or not the comparison time has arrived. As described above, in a case where the predetermined period of time T has elapsed since clocking was started in the last step S104, the CPU 102 determines that the comparison time has arrived. As described above, the movement distance of the hull 100a may be used to determine the arrival of the comparison time. In this case, the measurement of the movement distance can be started in step S104, and the arrival of the comparison time can be determined in step S108 based on whether the hull 100a has moved by the first predetermined distance.

In step S108, the CPU 102 returns the process to step S106 in a case where it is determined that the comparison time has not arrived, whereas the CPU 102 proceeds the process to step S109 in a case where it is determined that the comparison time has arrived.

In step S109, the CPU 102 compares the position (the predicted position) and the azimuth (the predicted azimuth) of the hull 100a, which are estimated in step S103, with the position (the actually detected position) and the azimuth (actually detected azimuth) of the hull 100a, which are detected at the comparison time this time (that is, which are detected in the last step S106), respectively. Then, the CPU 102 determines whether or not the hull 100a can be loaded onto the trailer 200 based on the comparison result.

Here, as described above, in a case where the distance D, which is the difference between the predicted position and the actually detected position, exceeds the second predetermined distance and/or the angle difference α, which is the difference between the predicted azimuth and the actually detected azimuth, exceeds the predetermined angle, the CPU 102 determines that the hull 100a cannot be loaded onto the trailer 200 (for example, the screen A3 in FIG. 5). In a case where the distance D does not exceed the second predetermined distance and the angle difference α does not exceed the predetermined angle, the CPU 102 determines that the hull 100a can be loaded onto the trailer 200 (for example, the screen A2).

Then, in a case where the CPU 102 determines that the hull 100a can be loaded onto the trailer 200, the process proceeds to step S110, whereas in a case where the CPU 102 determines that the hull 100a cannot be loaded onto the trailer 200, the process proceeds to step S111.

In step S110, the CPU 102 updates the state display screen. Namely, the CPU 102 causes the actually detected position of the hull 100a detected in the last step S106 to be displayed (for example, the actually detected position P1' is displayed on the screen A2), and causes "possible" indicating that loading is able to be performed to be displayed in the display area 502. After step S110, the CPU 102 returns the process to step S102.

As a result, in the next steps S103 to S105 after step S110, the estimation process is executed, the automatic vessel steering control is executed according to the content of the newly determined automatic vessel steering control, and the screen display is updated. For example, as shown on the screen A3, in the next step S103 after step S110, the predicted position P2 is predicted, and the new predicted trajectory 500 starting from the updated actually detected position (the actually detected position P1') is predicted. Further, in step S105, the predicted position P2 and the predicted trajectory 500 are displayed.

In step S111, the CPU 102 updates the state display screen. Namely, the CPU 102 causes the actually detected position of the hull 100a detected in the last step S106 to be displayed (for example, the actually detected position P2' is displayed on the screen A3), and causes "impossible" indicating that loading is not able to be performed to be displayed in the display area 502.

In step S112, the CPU 102 performs a control so as to reduce the speed of the hull 100a, thus preventing the hull 100a from becoming excessively close to the trailer 200. For example, the CPU 102 sets the output of the propulsion device 120 (rpm of the engine 125) to a predetermined value or less. Further, the CPU 102 may set the shift position of the forward-and-rearward switching mechanism 124 to the neutral position. It is noted that the process in step S112 may include a process of stopping the hull 100a or a process of holding the hull 100a at a fixed point.

In step S113, the CPU 102 executes a rearward movement process of causing the hull 100a to move rearward, and updates the state display screen. In the rearward movement process, the CPU 102 determines at least one of the steering angle or the output of the propulsion device 120, as the content of the automatic vessel steering control for rearward movement. Then, the CPU 102 switches the shift position to the rearward movement, and starts the vessel steering control according to the content of the automatic vessel steering control for rearward movement. It is noted that in the rearward movement process, the hull 100a may move rearward by a certain distance or for a certain period of time.

When determining and controlling the steering angle to cause the hull 100a to move rearward, the CPU 102 causes the hull 100a to move rearward by setting the steering angle (the steering direction) to the steering angle (a direction) (referred to as "reverse steering" in this case), which is opposite to the previous steering angle (the steering direction) for forward movement. In this way, when the hull 100a cannot be loaded onto the trailer 200 due to a disturbance, such as cross wind, the hull 100a can move rearward along a trajectory close to the movement trajectory at the time of forward movement of the hull 100a.

In a case where such reverse steering is used, the CPU 102 stores the steering angle at the time of forward movement of the hull 100a in the memory 111 as needed, and uses the last stored steering angle as the immediately preceding steering angle at the time of forward movement of the hull 100a. It is noted that, in a case where the reverse steering is used, the CPU 102 may determine the steering angle at the time of rearward movement of the hull 100*a* based on the stored steering angle at the time of the forward movement and the output of the propulsion device 120 determined for the rearward movement. In this case, for example, the CPU 102 may set the steering angle at the time of the rearward movement to be smaller as the output at the time of rearward movement is larger. Alternatively, from the viewpoint of reducing a processing load, the steering angle for the rearward movement may be set to a steering angle having the same value as and in a direction opposite to the stored steering angle, without performing a calculation or the like.

In the update of the state display screen in step S113, as exemplified in the screen A4, the CPU 102 displays, in the display area 503, a mark such as "R" indicating that the shift position is put in reverse. Further, the CPU 102 may predict the predicted trajectory 500R when the hull 100*a* moves rearward, which is a predicted future movement trajectory of the hull 100*a* starting from the current position, based on the content of the automatic vessel steering control for rearward movement, and may display the predicted trajectory 500R on the screen.

After step S113, the CPU 102 returns the process to step S102. In the subsequent process after step S102, the forward movement in the automatic trailer mode may be resumed. Alternatively, the automatic trailer mode may be interrupted in step S113, and the automatic trailer mode may be resumed by a restart instruction from a user in the other processes in next step S102.

According to the present preferred embodiment, the position and the azimuth of the hull 100*a* at the comparison time are estimated based on the determined content of the automatic vessel steering control. Then, it is determined whether or not the hull 100*a* can be loaded onto the trailer 200 based on the comparison result between the estimated position and azimuth and the position and azimuth detected at the comparison time, respectively. In a case where it is determined that the hull 100*a* cannot be loaded onto the trailer 200, a notification is provided. As a result, even when the hull 100*a* does not move as predicted by the control due to a disturbance such as wind, tidal current or waves, the vessel operator can recognize that situation before it becomes difficult to load the hull 100*a* onto the trailer 200. Therefore, the loading of the hull 100*a* onto the trailer 200 is facilitated.

In addition, in a case where it is determined that the hull 100*a* can be loaded onto the trailer 200, a notification is provided by displaying the indication of "possible", and in a case where it is determined that the hull 100*a* cannot be loaded onto the trailer 200, a notification is provided by displaying the indication of "impossible". As a result, the vessel operator can recognize whether or not the hull 100*a* can be loaded onto the trailer 200 by viewing the displayed indication.

In addition, in a case where the distance D, which is the difference between the predicted position and the actually detected position, exceeds the second predetermined distance and/or the angle difference α, which is the difference between the predicted azimuth and the actually detected azimuth, exceeds the predetermined angle, it is determined that the hull 100*a* cannot be loaded onto the trailer 200. As a result, the automatic vessel steering control is prevented from being continuously performed with a large deviation from the prediction in terms of the distance or the movement direction.

In addition, since the comparison time is repeated after the start of the automatic vessel steering control, it is possible to periodically notify the vessel operator of whether or not the hull 100*a* can be loaded onto the trailer 200, while causing the hull 100*a* to move toward the trailer 200.

In addition, in a case where it is determined that the hull 100*a* cannot be loaded onto the trailer 200, the hull 100*a* is caused to reduce the speed thereof or the hull 100*a* is caused to move rearward, thus making it possible to prevent the hull 100*a* from becoming excessively close to the trailer 200. It is noted that, it is not essential to temporarily reduce the speed of the hull 100*a* in a case where it is determined that the hull 100*a* cannot be loaded onto the trailer 200, and the process may immediately proceed to the rearward movement process (S113).

In addition, the steering angle at a time when it is determined that the hull 100*a* cannot be loaded onto the trailer 200 is stored, and the steering angle at the time when the hull 100*a* is caused to move rearward is set in a direction opposite to the stored steering angle. Accordingly, when the hull 100*a* cannot be loaded onto the trailer 200 due to a disturbance, such as crosswind, the hull 100*a* can move rearward along a trajectory close to the movement trajectory at the time of forward movement of the hull 100*a*. In particular, by determining the steering angle at the time when the hull 100*a* is caused to move rearward based on the stored steering angle and the output of the propulsion device 120 to cause the hull 100*a* to move rearward, it is possible to cause the hull 100*a* to move rearward along the trajectory closer to the movement trajectory at the time of forward movement of the hull 100*a*, in consideration of the output of the propulsion device 120. It is noted that, in a case where the steering angle at the time when the hull 100*a* is caused to move rearward is set to a steering angle in the direction opposite to the stored steering angle and having the same magnitude as the stored steering angle, a processing load such as a calculation of the steering angle can be reduced.

In addition, when the automatic vessel steering control to cause the hull 100*a* to move rearward is executed, the mark such as "R" is displayed to notify the vessel operator of the fact that the automatic vessel steering control is to be executed, thus making it possible to alert the vessel operator that the vessel is moving rearward.

In addition, when the automatic vessel steering control is being executed, "AUTO" is displayed to notify the vessel operator of the fact that the automatic vessel steering control is being executed, so that the vessel operator can visually recognize that the manual vessel steering is invalid.

It is noted that the indication modes such as "possible", "impossible", "R", "AUTO", the predicted trajectory 500 and 500R are examples, and the display modes are not limited thereto. In particular, the indications indicating a situation is not limited to "possible", "impossible", "R", and "AUTO", and each situation may be notified by displaying a message or the like. Further, instead of these displays or in addition thereto, each situation may be notified by sound.

Preferred embodiments of the present invention can also be realized by a process in which a program to perform one or more functions of the above-described preferred embodiments is supplied to a system or a device via a network or a non-transitory storage medium, and one or more processors or controllers of a computer of the system or the device reads and executes the program. The above program and the storage medium storing the above program are additional preferred embodiments of the present invention. Further, preferred embodiments of the present invention can also be implemented by a circuit (for example, ASIC) that performs one or more functions.

It is noted that preferred embodiments of the present invention are not limited to being applied to jet boats, and can also be applied to various marine vessels propelled by an outboard motor, an inboard motor, or an inboard/outboard motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A trailering support device for loading a hull onto a trailer, the trailering support device comprising:

one or more controllers configured or programmed to function as:

a vessel steering controller to perform an automatic vessel steering control to move the hull toward the trailer;

an estimation unit to estimate, based on a content of the automatic vessel steering control, a predicted position of the hull at a predetermined time after a start of the automatic vessel steering control and a predicted azimuth of the hull at the predetermined time, the content of the automatic vessel steering control including at least one of a control of a steering angle of the hull or a control of an output of a propulsion device that propels the hull;

a detector to detect a position of the hull, the steering angle of the hull, and an azimuth of the hull;

a determination unit to compare the predicted position and the predicted azimuth estimated by the estimation unit, respectively, with the position and the azimuth detected by the detector at the predetermined time, and to determine based on a comparison result whether the loading of the hull onto the trailer is able to be performed or not; and a notifier to provide notification, in a case where the determination unit determines that the loading of the hull onto the trailer is not able to be performed, that the loading of the hull onto the trailer is not able to be performed; wherein the vessel steering controller is configured to cause the hull to move rearward in the case where it is determined that the loading of the hull onto the trailer is not able to be performed; and the vessel steering controller is configured to store the steering angle at a time when it is determined that the loading of the hull onto the trailer is not able to be performed, and to set the steering angle of the hull being moved rearward to a steering angle in a direction opposite to the stored steering angle.

2. The trailering support device according to claim 1, wherein the determination unit is configured to determine that the loading of the hull onto the trailer is not able to be performed in a case where a difference between the estimated position and the detected position exceeds a predetermined distance and/or a difference between the estimated azimuth and the detected azimuth exceeds a predetermined angle.

3. The trailering support device according to claim 1, wherein the predetermined time is repeated after the start of the automatic vessel steering control.

4. The trailering support device according to claim 3, wherein the predetermined time is a time at which the hull moves by a predetermined distance or a predetermined period of time elapses, after the last time the estimation unit estimates the predicted position and the predicted azimuth of the hull.

5. The trailering support device according to claim 1, wherein the vessel steering controller is configured to reduce a speed of the hull in the case where it is determined that the loading of the hull onto the trailer is not able to be performed.

6. The trailering support device according to claim 1, wherein the vessel steering controller is configured to determine the steering angle of the hull being moved rearward based on the stored steering angle and an output of a propulsion device that propels the hull being moved rearward.

7. The trailering support device according to claim 1, wherein the vessel steering controller is configured to set the steering angle of the hull being moved rearward to a steering angle in the direction opposite to the stored steering angle and having a same magnitude as the stored steering angle.

8. The trailering support device according to claim 1, wherein the notifier is configured to provide notification, when the hull is caused to move rearward, that the hull is caused to move rearward.

9. The trailering support device according to claim 1, wherein the notifier is configured to provide notification, when it is determined that the loading of the hull is able to be performed, that the loading of the hull is able to be performed.

10. The trailering support device according to claim 1, wherein the notifier is configured to provide notification, when the automatic vessel steering control is being executed, that the automatic vessel steering control is being executed.

11. A trailering system comprising:

a marine vessel including a hull;

a trailering support device for loading the hull onto a trailer, the trailering support device including:

one or more controllers configured or programmed to function as:

a vessel steering controller to perform an automatic vessel steering control to move the hull toward the trailer;

an estimation unit to estimate, based on a content of the automatic vessel steering control, a predicted position of the hull at a predetermined time after a start of the automatic vessel steering control and a predicted azimuth of the hull at the predetermined time, the content of the automatic vessel steering control including at least one of a control of a steering angle of the hull or a control of an output of a propulsion device that propels the hull;

a detector to detect a position of the hull, the steering angle of the hull, and an azimuth of the hull;

a determination unit to compare the predicted position and the predicted azimuth estimated by the estimation unit, respectively, with the position and the azimuth detected by the detector at the predetermined time, and to determine, based on a comparison result, whether the loading of the hull onto the trailer is able to be performed or not; and a notifier to provide notification, in a case where the determination unit determines that the loading of the hull onto the trailer is not able to be performed, that the loading of the hull onto the trailer is not able to be performed; wherein the vessel steering controller is configured to cause the hull to move rearward in the case where it is determined that the loading of the hull onto the trailer is not able to be performed; and the vessel steering controller is configured to store the steering angle at a time when it is determined that the loading of the hull onto the trailer is not able to be performed, and to set the steering angle of the hull being moved rearward to a steering angle in a direction opposite to the stored steering angle.

12. A trailering support method for loading a hull onto a trailer, the trailering support method comprising:

performing an automatic vessel steering control to move the hull toward the trailer;

estimating, based on a content of the automatic vessel steering control, a predicted position of the hull at a predetermined time after a start of the automatic vessel steering control and a predicted azimuth of the hull at the predetermined time, the content of the automatic vessel steering control including at least one of a control of a steering angle of the hull or a control of an output of a propulsion device that propels the hull;

detecting a position of the hull, the steering angle of the hull, and an azimuth of the hull;

comparing the estimated predicted position and the estimated predicted azimuth, respectively, with the position and the azimuth detected at the predetermined time, and determining, based on a comparison result, whether the loading of the hull onto the trailer is able to be performed or not;

providing notification, in a case where it is determined that the loading of the hull onto the trailer is not able to be performed, that the loading of the hull onto the trailer is not able to be performed;

in the case where it is determined that the loading of the hull onto the trailer is not able to be performed, causing the hull to move rearward; and storing the steering angle at a time when it is determined that the loading of the hull onto the trailer is not able to be performed, and setting the steering angle of the hull being moved rearward to a steering angle in a direction opposite to the stored steering angle.

\* \* \* \* \*